United States Patent [19]
Marchant et al.

[11] Patent Number: 5,212,125
[45] Date of Patent: May 18, 1993

[54] PROCESS FOR SINTERING ALUMINUM NITRIDE USING ORGANOMETALLIC COMPOUNDS

[75] Inventors: David D. Marchant; Joseph R. Fox, both of Solon; Timothy W. Brauneck, Thompson, all of Ohio

[73] Assignee: The Carborundum Company, Nigara Falls, N.Y.

[21] Appl. No.: 616,153

[22] Filed: Nov. 20, 1990

[51] Int. Cl.$^5$ .............. C04B 35/58; C04B 35/52; C04B 35/54; F27B 9/10
[52] U.S. Cl. .................... 501/96; 501/98; 501/12; 501/100; 501/153; 264/65; 423/263; 423/412
[58] Field of Search .......... 501/12, 94, 96, 98, 501/100, 152, 153; 427/214, 215, 377, 378; 264/65

[56] References Cited

U.S. PATENT DOCUMENTS

| | | | |
|---|---|---|---|
| 3,811,899 | 5/1974 | Stibbs et al. | 106/43 |
| 3,833,389 | 9/1974 | Komeya et al. | 106/55 |
| 4,547,471 | 10/1985 | Huseby et al. | 501/98 |
| 4,578,232 | 3/1986 | Huseby et al. | 264/65 |
| 4,578,364 | 3/1986 | Huseby et al. | 501/98 |
| 4,650,777 | 3/1987 | Kurokawa et al. | 501/96 |
| 4,719,187 | 1/1988 | Bardhan et al. | 501/97 |
| 4,740,574 | 4/1988 | Bott et al. | 528/9 |
| 4,755,491 | 7/1988 | Miwa | 501/96 |
| 4,766,097 | 8/1988 | Shinozaki et al. | 501/98 |
| 4,783,430 | 11/1988 | Su | 501/96 |
| 4,869,925 | 9/1989 | Hiai et al. | 427/96 |
| 4,883,780 | 11/1989 | Kasori et al. | 501/96 |
| 4,983,462 | 1/1991 | Hiai et al. | 428/432 |

FOREIGN PATENT DOCUMENTS

378414 7/1990 European Pat. Off. .

OTHER PUBLICATIONS

Iwase et al., "Development of a High Thermal Conductive AIN Ceramic Substrate Technology", Int. Jour. Hybrid Microelectronics, vol. 7, No. 4, Dec. 1984.

Komeya et al., "Effects of Various Additives on Sintering of Aluminum Nitride," Translation of the Journal of the Ceramic Society of Japan, vol. 89, No. 6, 1981, pp. 330-336.

Primary Examiner—William R. Dixon, Jr.
Assistant Examiner—Michael Marcheschi
Attorney, Agent, or Firm—Larry W. Evans; Joseph G. Curatolo

[57] ABSTRACT

A process for producing a sintered AlN ceramic body by mixing an organic solution comprising a hydrocarbon solvent and an organometallic compound with AlN powder to produce a slurry, removing the solvent from the slurry to form a mixture of organometallic compound and AlN, forming the mixture into a shape, and heating the shape in a non-oxidizing atmosphere to sintering temperature to obtain densification.

9 Claims, 1 Drawing Sheet

PROCESS FOR SINTERING ALUMINUM NITRIDE USING ORGANOMETALLIC COMPOUNDS

BACKGROUND OF THE INVENTION

The present invention relates to a process for preparing a sintered body of aluminum nitride and more particularly, to a process for preparing aluminum nitride which uses an organoyttrium compound as a sintering aid and dispersant.

Aluminum nitride (AlN) possesses high thermal conductivity, electrical resistivity and a coefficient of thermal expansion compatible to silicon. In addition, AlN is a high strength ceramic material capable of maintaining its high strength characteristics even at high temperatures and extreme thermal shock. Because of these properties, AlN is used as a heat resistant material for high temperature applications and as a heat dissipating material for substrates of semiconductor devices.

An AlN sintered body is usually prepared by forming the ceramic powder into the desired shape and sintering at high temperatures. However, because of its highly covalent structure, it is very difficult to sinter AlN powders to full density without the addition of a sintering aid. Alkaline-earth metal compounds as well as rare-earth metal compounds are known as sintering aids for AlN. These compounds can react with oxides contained in the powder to form a liquid phase, which promotes particle rearrangement and grain growth as a result of a solution-precipitation mechanism. K. Komeya et al., in "Effects of Various Additives on Sintering of Aluminum Nitride", Translation of the Journal of the Ceramic Society of Japan, Vol. 89, No. 6, 1981, pp. 330-36, discloses that the addition of 5% by weight of $Y_2O_3$ substantially improved the densification of AlN and attributes this improved densification to the formation of a nitrogen containing aluminate liquid in the system aluminum nitride-yttrium oxide.

The use of yttrium compounds as sintering aids for AlN is described in several publications. Shinozaki, et al., in "Sintering Behavior and Thermal Characteristics of Pressureless Sintered AlN with $Y_2O_3$ Addition", 2nd Symposium on Basic Science of Ceramics, Yogyo-Kyokai, January 1984, found that the addition of at least 0.5% by weight of $Y_2O_3$ not only enables good densification, but also makes it possible to form a product having a higher thermal conductivity than a product obtained without adding any such aid.

U.S. Pat. No. 3,833,389 issued Sep. 3, 1974, to Komeya et al., teaches that instead of using oxides of lanthanum, cerium, scandium, yttrium and yttrium aluminum garnet, or mixtures thereof, a material which is capable of producing one of the oxides under the sintering conditions can be used. For example, instead of using yttrium oxide, yttrium carbonyl ($Y_2OC$) or yttrium hydroxide ($Y(OH)_3$) may be used to form yttrium oxide prior to sintering.

U.S. Pat. No. 4,578,232 issued Mar. 25, 1986, to Huseby et al., discloses that the sintering aid, yttrium oxide, can be provided by means of a yttrium oxide precursor. The term yttrium oxide precursor means any organic or inorganic compound which decomposes completely at a temperature below about 1200° C. to form yttrium oxide and a by-product gas which vaporizes away leaving no contaminants in the sintered body which would be detrimental to the thermal conductivity. Examples of these precursors are yttrium acetate, yttrium carbonate, yttrium oxalate, yttrium nitrate, yttrium sulfate and yttrium hydroxide.

The thermal conductivity of aluminum nitride is a function of its dissolved oxygen content and decreases with an increase in dissolved oxygen. Because aluminum nitride powder has an affinity for oxygen, especially when its surface is not covered by an oxide, it is necessary to remove the excess oxygen when high thermal conductivity is important. Aqueous solutions for the processing of AlN powder are not desirable since the powder will react with the water to liberate $NH_3$ and form an $Al_2O_3$ precursor such as AlOOH or Al(OH)$_3$, which increases the oxygen content of the powder. The sintering aids of the present invention are compatible with non-aqueous solutions and thus help to prevent the addition of excess oxygen to the AlN powder during processing.

A major problem with the use of sintering aids is the ability to uniformly distribute the aid prior to sintering. Most sintering aids are added as separate powders with the hope that mixing the powders will result in a uniform distribution. A need exists, therefore, for a process of uniformly distributing the sintering aid to obtain a sintered body having uniform chemical and electrical properties, in addition to high mechanical strength and high thermal conductivity.

SUMMARY OF THE INVENTION

The present invention has resulted from the discovery that an organoyttrium sintering aid can be uniformly distributed in AlN powder to produce a dense sintered AlN body having uniform composition and physical properties such as thermal conductivity.

Organoyttrium compound is defined as a compound containing yttrium bonded to an organic group, wherein the organic group contains enough hydrocarbyl character to impart solubility in common organic solvents such as hydrocarbons and alcohols. Examples include yttrium alkoxides and yttrium alkoxycarboxylates.

The present process for making sintered AlN bodies includes the steps of mixing an organic solvent, an organoyttrium compound and AlN powder to produce a slurry. Next, the solvent is removed from the slurry to form a mixture of organoyttrium compound and AlN. This mixture is then formed into a shape. Finally, the shape is heated in a non-oxidizing atmosphere to sintering temperature to obtain densification.

The process of the present invention results in a uniform distribution of the sintering aid. This invention avoids the use of $H_2O$, which can introduce unwanted oxygen into the powder. In addition, it is possible to achieve with the process of the present invention efficient sintering with an overall lower concentration of yttrium than when yttria is used as the sintering aid.

The present invention will become more apparent from the following description in conjunction with the accompanying drawings.

DETAILED DESCRIPTION OF THE INVENTION

Figure 1:
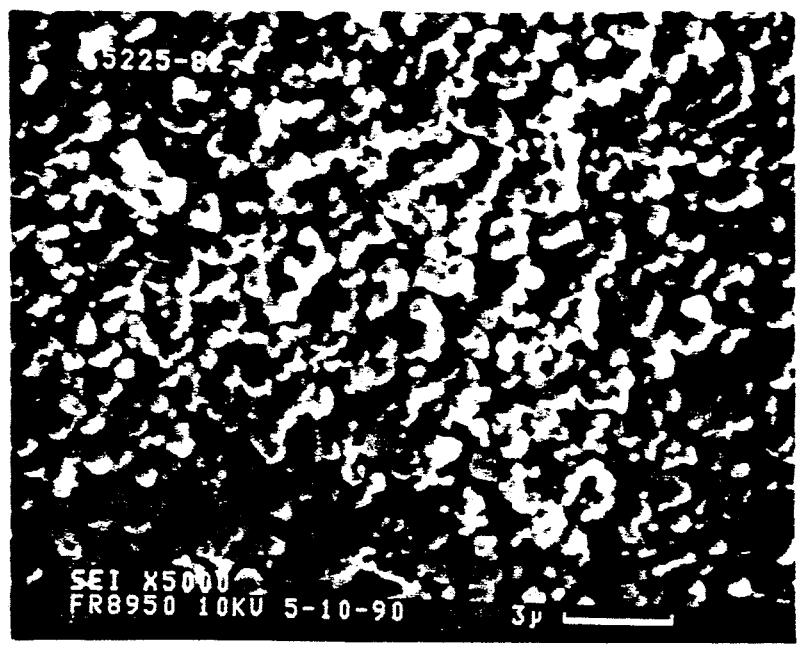
FIG. 1 is a 5,000 times magnified microscopic photograph illustrating the presintered AlN powder prepared by the method of the present invention.

The organoyttrium compounds of the present invention are in the form of yttrium alkoxides, $Y(OR)_x(OR')_{3-x}$, where $x=1$, 2 or 3, or yttrium alkoxycarboxylates, $Y(OR)_z(OOCR')_{3-z}$, where $z=1$ or 2. It is preferable that the R group is a saturated hydrocarbon group containing four or less carbons, such as methyl, ethyl, propyl or isopropyl. The R' hydrocarbyl group should contain 12 or more carbons, enough carbons so that the hydrocarbyl chain can extend into a nonpolar hydrocarbon liquid such as hexane and provide a steric barrier which prevents flocculation. An organoyttrium compound that has been found to work extremely well is yttrium isopropoxide. The alkoxide reacts with hydroxyl groups present at the surface of the AlN powder particles to liberate a molecule of alcohol and covalently bond the organoyttrium molecule to the particle surrace.

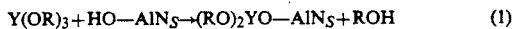

$$Y(OR)_3 + HO-AlN_S \rightarrow (RO)_2YO-AlN_S + ROH \qquad (1)$$

In addition to reacting with the hydroxyl groups on the particle surface, the alkoxide can also react with any water present in the organic solvent. Two types of reactions are likely to occur in the presence of water; hydrolysis and condensation. Hydrolysis usually produces partially hydrolyzed species which can undergo subsequent condensation reactions to produce dimeric, trimeric and larger species. The hydrolysis reaction is:

$$Y(OR)_3 + H_2O \rightarrow Y(OR)_{3-x}(OH)_x + xROH, \text{ where } x=1, 2 \text{ or } 3 \qquad (2)$$

Condensation reactions liberate a molecule of alcohol or water and produce a condensed species. These condensation reactions are:

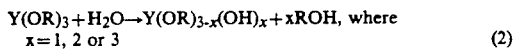

$$2X_2YOH \rightarrow X_2YOYX_2 + H_2O, \text{ where } X=OR \text{ or } OH \qquad (3)$$

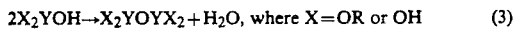
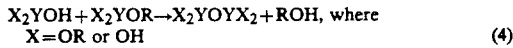

$$X_2YOH + X_2YOR \rightarrow X_2YOYX_2 + ROH, \text{ where } X=OR \text{ or } OH \qquad (4)$$

As condensation reactions proceed, large polymeric networks can form which can eventually result in the formation of a gel or in discrete particles which can precipitate from solution. It is possible that these polymers could react with the surface of the particle as well.

Other organometallic compounds in the form of metal alkoxides and metal alkoxycarboxylates can be used as sintering aids and dispersants. For example, trivalent rare earth elements may be used in the form $M(OR)_x(OR')_{3-x}$, where $x=1$, 2 or 3, or $M(OR)_z(OOCR')_{3-z}$, where $z=1$ or 2, and M is a trivalent rare earth such as La, Ce, Pr or Nd. Quadravalent rare earth elements may be used in the form $M'(OR)_y(OR')_{4-y}$, where $y=1,2,3$, or 4, or $M'(OR)_a(OOCR')_{4-a}$, where $a=1,2$ or 3, and M' is a quadravalent rare earth such as Ce or Pr. Alkaline earth elements may be used in the form $M''(OR)_b(OR')_b$, where $b=1$, or 2, or $M''(OR)(OOCR')$ and M" is an alkaline-earth element such as Mg, Ca, Ba or Sr. The preferred metal alkoxide is a yttrium alkoxide.

It is possible to synthesize mixed alkoxides or alkoxylates from simple yttrium alkoxides such as yttrium isopropoxide by refluxing the alkoxide with the appropriate long chain alcohol or carboxylic acid in an inert hydrocarbon solvent.

Figure 2:
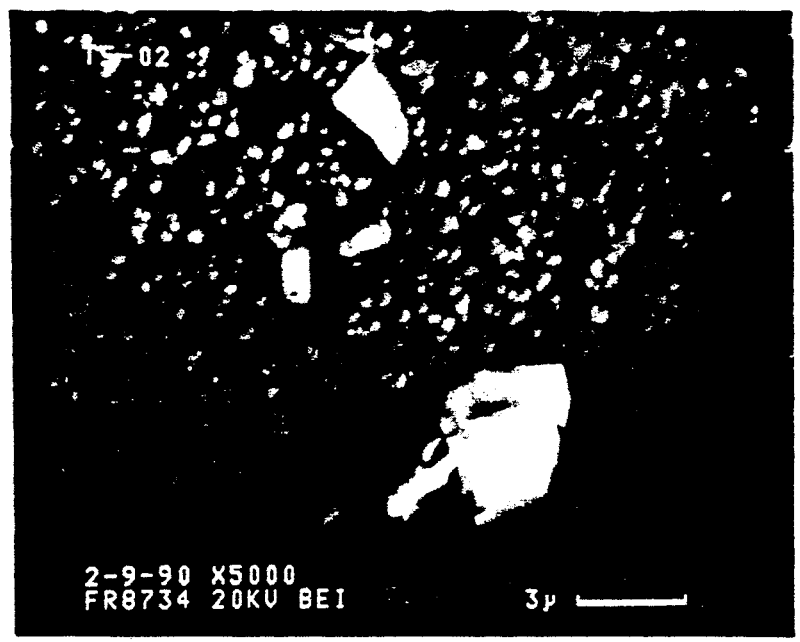
FIG. 2 is a 5,000 times magnified microscopic photograph illustrating presintered particulate AlN powder to which yttrium oxide has been added as a sintering aid.

The covalent bonding of the organoyttrium compound to the AlN particle surface should also take place in an inert hydrocarbon solvent, such as heptane or toluene, particularly in view of the hydrolytic instability of AlN. Other useful hydrocarbon solvents include ethanol, propanol, isopropanol, methyl ethyl ketone, and mixtures thereof. Because the yttrium compound is covalently bonded to the surface of the particles, a homogeneous distribution of yttrium would be expected. Comparing FIG. 1, which is a micrograph of AlN powder prepared by the method of the present invention to FIG. 2, which is a micrograph of AlN powder prepared using $Y_2O_3$ as the sintering aid, it can be seen that the present invention results in a more uniform distribution of the sintering aid. In FIG. 2, the large white particles are particles of $Y_2O_3$ which are typically present in presintered AlN powder using $Y_2O_3$ as the sintering aid. These large particles are absent from the AlN powder prepared by the present invention, even though an equivalent amount of yttrium is present in the powder as discovered in Energy Dispersive Spectroscopy spectrum analysis. It should be possible to obtain more uniform sintering and better densification. It may also be possible to achieve efficient sintering with an overall lower concentration of yttrium in view of the more homogeneous distribution of the sintering aid and the fact that the yttrium is attached to the surface of the AlN particles.

The organoyttrium dispersant is decomposed under an inert atmosphere such as nitrogen or in air. More efficient carbon removal would be expected under the latter. The organoyttrium dispersants may be used in conjunction with other organic or inorganic additives commonly used in ceramic processing, i.e., binders and plasticizers.

According to the method of this invention, the organoyttrium compound, in an amount between 0.1% and 12% by weight with respect to the dry weight of AlN powder, is mixed in a non-aqueous solvent, such as heptane. The heptane should have a low water content, preferably below 0.1% by weight. The heptane solution containing the organoyttrium compound is then mixed with the AlN powder to a concentration approximately 25% solids to form a slurry. The slurry must be mixed well. Mixing by a stir bar on a stirring plate is adequate, but ultrasonic mixing is preferred. The slurry is either dried or placed in a colloid press to remove the heptane. The colloid press is an apparatus consisting of filters to facilitate the removal of heptane while pressing the slurry into a compact shape. If a colloid press is used, the compact shape must be further dried before sintering to remove the bulk of heptane remaining. Drying of the slurry can also be accomplished by evaporation, spray-drying, or other commonly known methods. If the slurry is dried before pressing, the dried powder is shaped using a cold-press die technique. The AlN could also be cast into a tape by tape-casting. The shaped compact is heated to sintering temperatures to obtain densification. The sintering is carried out in a non-oxidizing atmosphere to restrict the conversion of aluminum nitride to aluminum oxide.

Also, according to the method of this invention, the organoyttrium compound may be added to the AlN powder in the form of a gel. A gel is formed when the organoyttrium compound is added to a polar solvent in the presence of water. The water hydrolyzes the organoyttrium compound, which then undergoes a condensation reaction to form a gel. Although gel formation is not preferred, AlN powder treated with organoyttrium gel will still produce a more dense AlN sintered body than when $Y_2O_3$ is used as sintering aid in an equivalent amount.

The following examples illustrate the invention.

EXAMPLE 1

In a dry box containing a nitrogen atmosphere, 0.13 grams yttrium isopropoxide is added to 75 grams heptane and stirred by a magnetic stir bar to form a solution. The heptane solution is then well mixed with 26 grams dry AlN powder, supplied by Hermann Starck Gmbh., by ultrasonic mixing to form a slurry. The slurry is dried by evaporation to remove the heptane, resulting in AlN powder mixed with yttrium isopropoxide in an amount which is 0.5% by weight of the dry AlN powder. This AlN powder mixture is pressed into a shape using a metal die at 18000 psi and then sintered at 1700° C. in a nitrogen atmosphere for 1 hour.

EXAMPLE 2

Substantially in accordance with the procedure of example 1, except that the amount of yttrium isopropoxide was increased to 1.0% by weight of the dry AlN powder.

Example 3

Substantially in accordance with the procedure of example 1, except that the amount of yttrium isopropoxide was increased to 5% by weight of the dry AlN powder and the sintering temperature was increased to 1750° C.

EXAMPLE 4

Yttrium isopropoxide is dissolved in toluene and 0.3 to 0.5 g of ethyl alcohol is then added to this solution. The solution is allowed to stand in air for two to four hours until a gel forms. AlN powder is dispersed in toluene to a concentration of approximately 25% solids with 2% by weight of Lubrizol 2155 TM dispersant. The gel is added to the dispersed AlN powder and this mixture is sonicated to break up agglomerates. The mixture is then dried at low heat and pressed into a shape. The shape is then sintered at 1750° C. for one hour.

EXAMPLE 5

Substantially in accordance with the procedure of example 4, except that the shape is sintered at 1650° C. for one hour.

TABLE 1

| Example Number | Sample Number | Sintering Temp. ± 50° C. | Sintering Aids | Wt % Sintering Aid | % of theoretical Sintered Density |
|---|---|---|---|---|---|
| 1 | 36-5 | 1700° C. | YI* | 0.5** | 96 |
|  | 36-1 | " | $Y_2O_3$ | 0.249 | 93 |
| 2 | 36-6 | 1700° C. | YI* | 1.0 | 95 |
|  | 36-2 | " | $Y_2O_3$ | 0.499 | 91.4 |
| 3 | 40-14 | 1750° C. | YI* | 5 | 100 |
|  | 40-15 | " | YI* | 5 | 97 |
|  | 40-16 | " | $Y_2O_3$ | 2.5 | 96.4 |
| 4 | 3-19 | 1750° C. | YI* gel | 3 | 99 |
|  | 1-19 | " | YI* gel | 1 | 98.9 |
| 5 | 18-T-1 | 1650° C. | YI* gel | 1 | 98.2 |
|  | 18-1-1 | " | YI* gel | 1 | 95.4 |
|  | 28-3 | " | $Y_2O_3$ | 0.5 | 82 |

*YI: yttrium isopropoxide
**YI: Content × 0.499 = equivalent amount of $Y_2O_3$

Table 1 shows the results of sintering aluminum nitride prepared by the method of the present invention. Specifically, the percentage of the theoretical sintered density of the resulting samples of examples 1-5 are presented and compared to samples of AlN sintered bodies where the sintering aid was $Y_2O_3$. The results in Table 1 show that, when yttrium isopropoxide is used in accordance with the present invention, a more dense AlN sintered body is produced than when $Y_2O_3$ is used as a sintering aid in an equivalent amount.

What we claim is:

1. A process for producing a sintered AlN ceramic body comprising:

mixing a hydrocarbon solvent, an organometallic compound selected from the group consisting of metal alkoxides and metal alkoxycarboxylates, and AlN powder to produce a slurry having an amount of said organometallic compound ranging from about 0.1-12% by weight with respect to the dry weight of said AlN powder;

removing said solvent from said slurry to form a mixture of organometallic compound and AlN;

forming said mixture into a shape; and sintering said shape in a non-oxidizing atmosphere to obtain densification.

2. A process for producing a sintered AlN ceramic body as claimed in claim 1 wherein said metal alkoxide is selected from the group consisting of:

$M(OR)_x(OR')_{3-x}$, wherein $x=1, 2$ or 3 and M is selected from the group consisting of Y, La, Ce, Pr and Nd;

$M'(OR)_y(OR')_{4-y}$, wherein $y=1, 2, 3$ or 4 and M is selected from the group consisting of Ce and Pr; and $M''(OR)_z(OR')_{2-z}$, wherein $z=1$ or 2 and M is selected from the group consisting of Mg, Ca, Ba and Sr, and wherein R comprises a saturated hydrocarbon group containing 4 or less carbons, and R' comprises a hydrocarbyl group containing at least 12 carbons.

3. A process for producing a sintered AlN ceramic body as claimed in claim 1 wherein said metal alkoxycarboxylate is selected from the group consisting of:

$M(OR)_x(OOCR')_{3-x}$, wherein $x=1$ or 2 and M is selected from the group consisting of Y, La, Ce, Pr and Nd;

$M'(OR)_y(OOCR')_{4-y}$, wherein $y=1, 2,$ or 3 and M' is selected from the group consisting of Ce and Pr; and $M''(OR)(OOCR')$, wherein M" is selected from the group consisting of Mg, Ca, Ba and Sr, and wherein R comprises a saturated hydrocarbon group containing 4 or less carbons, and R' comprises a hydrocarbyl group containing at least 12 carbons.

4. A process for producing a sintered AlN ceramic body as claimed in claim 2 wherein said metal alkoxide comprises a yttrium alkoxide.

5. A process for producing a sintered AlN ceramic body as claimed in claim 1 wherein said hydrocarbon solvent comprises one selected from the group consisting of heptane, toluene, ethanol, propanol, isopropanol, methyl ethyl ketone, and mixtures thereof.

6. A process for producing a sintered AlN ceramic body as claimed in claim 1 wherein said solvent is removed from said slurry by evaporation.

7. A process for producing a sintered AlN ceramic body as claimed in claim 1 wherein said solvent is removed from said slurry by colloid pressing said slurry.

8. A process for producing a sintered AlN ceramic body as claimed in claim 1 wherein said organometallic compound is dissolved in an organic solvent and allowed to form a gel before mixing with said hydrocarbon solvent and said AlN powder.

9. A process for producing a sintered AlN ceramic body as claimed in claim 2 wherein said metal alkoxide comprises yttrium isopropoxide.

* * * * *